United States Patent
Goliya et al.

(10) Patent No.: US 10,931,560 B2
(45) Date of Patent: Feb. 23, 2021

(54) USING ROUTE TYPE TO DETERMINE ROUTING PROTOCOL BEHAVIOR

(71) Applicant: VMWARE, INC., Palo Alto, CA (US)

(72) Inventors: Abhishek Goliya, Pune (IN); Ankur Dubey, Palo Alto, CA (US)

(73) Assignee: VMWARE, INC., Palo Alto, CA (US)

( * ) Notice: Subject to any disclaimer, the term of this patent is extended or adjusted under 35 U.S.C. 154(b) by 0 days.

(21) Appl. No.: 16/275,355

(22) Filed: Feb. 14, 2019

(65) Prior Publication Data
US 2020/0169496 A1 May 28, 2020

(30) Foreign Application Priority Data
Nov. 23, 2018 (IN) .............................. 201841044147

(51) Int. Cl.
*H04L 12/751* (2013.01)
*H04L 12/717* (2013.01)
*H04L 12/741* (2013.01)

(52) U.S. Cl.
CPC .............. *H04L 45/02* (2013.01); *H04L 45/42* (2013.01); *H04L 45/745* (2013.01)

(58) Field of Classification Search
CPC ........ H04L 45/02; H04L 45/745; H04L 45/42
See application file for complete search history.

(56) References Cited

U.S. PATENT DOCUMENTS

| | | | |
|---|---|---|---|
| 5,504,921 A | 4/1996 | Dev et al. | |
| 5,550,816 A | 8/1996 | Hardwick et al. | |
| 5,751,967 A | 5/1998 | Raab et al. | |
| 6,006,275 A | 12/1999 | Picazo et al. | |
| 6,104,699 A | 8/2000 | Holender et al. | |
| 6,219,699 B1 | 4/2001 | McCloghrie et al. | |
| 6,359,909 B1 | 3/2002 | Ito et al. | |
| 6,456,624 B1 | 9/2002 | Eccles et al. | |
| 6,512,745 B1 | 1/2003 | Abe et al. | |

(Continued)

FOREIGN PATENT DOCUMENTS

| | | |
|---|---|---|
| CN | 1442987 A | 9/2003 |
| CN | 1714548 A | 12/2005 |

(Continued)

OTHER PUBLICATIONS

Agarwal, Sugam, et al., "Traffic Engineering in Software Defined Networks," 2013 Proceedings IEEE INFOCOM, Apr. 14, 2013, 10 pages, Bell Labs, Alcatel-Lucent, Holmdel, NJ, USA.

(Continued)

*Primary Examiner* — Jay P Patel
(74) *Attorney, Agent, or Firm* — Adeli LLP (57) ABSTRACT

Some embodiments provide a method for implementing a logical network. Based on logical network configuration data, the method identifies a route for a set of network addresses to add to a routing table of the logical router, and also identifies a route type for the identified route. The method determines whether to include the identified route as a route for the logical router to advertise based on the route type of the identified route. The method distributes a routing table comprising the identified route to a computing device that implements the logical router, where the computing device advertises the identified route when the route type is specified for advertisement.

17 Claims, 7 Drawing Sheets

(56) References Cited

U.S. PATENT DOCUMENTS

| | | |
|---|---|---|
| 6,539,432 B1 | 3/2003 | Taguchi et al. |
| 6,680,934 B1 | 1/2004 | Cain |
| 6,785,843 B1 | 8/2004 | McRae et al. |
| 6,914,907 B1 | 7/2005 | Bhardwaj et al. |
| 6,941,487 B1 | 9/2005 | Balakrishnan et al. |
| 6,950,428 B1 | 9/2005 | Horst et al. |
| 6,963,585 B1 | 11/2005 | Pennec et al. |
| 6,999,454 B1 | 2/2006 | Crump |
| 7,046,630 B2 | 5/2006 | Abe et al. |
| 7,107,356 B2 | 9/2006 | Baxter et al. |
| 7,197,572 B2 | 3/2007 | Matters et al. |
| 7,200,144 B2 | 4/2007 | Terrell et al. |
| 7,209,439 B2 | 4/2007 | Rawlins et al. |
| 7,260,648 B2 | 8/2007 | Tingley et al. |
| 7,283,473 B2 | 10/2007 | Arndt et al. |
| 7,342,916 B2 | 3/2008 | Das et al. |
| 7,391,771 B2 | 6/2008 | Orava et al. |
| 7,447,197 B2 | 11/2008 | Terrell et al. |
| 7,450,598 B2 | 11/2008 | Chen et al. |
| 7,463,579 B2 | 12/2008 | Lapuh et al. |
| 7,478,173 B1 | 1/2009 | Delco |
| 7,483,411 B2 | 1/2009 | Weinstein et al. |
| 7,555,002 B2 | 6/2009 | Arndt et al. |
| 7,606,260 B2 | 10/2009 | Oguchi et al. |
| 7,630,358 B1 | 12/2009 | Lakhani et al. |
| 7,643,488 B2 | 1/2010 | Khanna et al. |
| 7,649,851 B2 | 1/2010 | Takashige et al. |
| 7,653,747 B2 | 1/2010 | Lucco et al. |
| 7,710,874 B2 | 5/2010 | Balakrishnan et al. |
| 7,742,459 B2 | 6/2010 | Kwan et al. |
| 7,764,599 B2 | 7/2010 | Doi et al. |
| 7,778,268 B2 | 8/2010 | Khan et al. |
| 7,792,097 B1 | 9/2010 | Wood et al. |
| 7,792,987 B1 | 9/2010 | Vohra et al. |
| 7,802,000 B1 | 9/2010 | Huang et al. |
| 7,818,452 B2 | 10/2010 | Matthews et al. |
| 7,826,482 B1 | 11/2010 | Minei et al. |
| 7,839,847 B2 | 11/2010 | Nadeau et al. |
| 7,885,276 B1 | 2/2011 | Lin |
| 7,936,770 B1 | 5/2011 | Frattura et al. |
| 7,937,438 B1 | 5/2011 | Miller et al. |
| 7,948,986 B1 | 5/2011 | Ghosh et al. |
| 7,953,865 B1 | 5/2011 | Miller et al. |
| 7,987,506 B1 | 7/2011 | Khalid et al. |
| 7,991,859 B1 | 8/2011 | Miller et al. |
| 7,995,483 B1 | 8/2011 | Bayar et al. |
| 8,027,260 B2 | 9/2011 | Venugopal et al. |
| 8,027,354 B1 | 9/2011 | Portolani et al. |
| 8,031,633 B2 | 10/2011 | Bueno et al. |
| 8,046,456 B1 | 10/2011 | Miller et al. |
| 8,054,832 B1 | 11/2011 | Shukla et al. |
| 8,055,789 B2 | 11/2011 | Richardson et al. |
| 8,060,875 B1 | 11/2011 | Lambeth |
| 8,131,852 B1 | 3/2012 | Miller et al. |
| 8,149,737 B2 | 4/2012 | Metke et al. |
| 8,155,028 B2 | 4/2012 | Abu-Hamdeh et al. |
| 8,166,201 B2 | 4/2012 | Richardson et al. |
| 8,194,674 B1 | 6/2012 | Pagel et al. |
| 8,199,750 B1 | 6/2012 | Schultz et al. |
| 8,223,668 B2 | 7/2012 | Allan et al. |
| 8,224,931 B1 | 7/2012 | Brandwine et al. |
| 8,224,971 B1 | 7/2012 | Miller et al. |
| 8,239,572 B1 | 8/2012 | Brandwine et al. |
| 8,259,571 B1 | 9/2012 | Raphel et al. |
| 8,265,075 B2 | 9/2012 | Pandey |
| 8,281,067 B2 | 10/2012 | Stolowitz |
| 8,312,129 B1 | 11/2012 | Miller et al. |
| 8,339,959 B1 | 12/2012 | Moisand et al. |
| 8,339,994 B2 | 12/2012 | Gnanasekaran et al. |
| 8,345,650 B2 | 1/2013 | Foxworthy et al. |
| 8,351,418 B2 | 1/2013 | Zhao et al. |
| 8,370,834 B2 | 2/2013 | Edwards et al. |
| 8,416,709 B1 | 4/2013 | Marshall et al. |
| 8,456,984 B2 | 6/2013 | Ranganathan et al. |
| 8,504,718 B2 | 8/2013 | Wang et al. |
| 8,559,324 B1 | 10/2013 | Brandwine et al. |
| 8,565,108 B1 | 10/2013 | Marshall et al. |
| 8,600,908 B2 | 12/2013 | Lin et al. |
| 8,611,351 B2 | 12/2013 | Gooch et al. |
| 8,612,627 B1 | 12/2013 | Brandwine |
| 8,625,594 B2 | 1/2014 | Safrai et al. |
| 8,625,603 B1 | 1/2014 | Ramakrishnan et al. |
| 8,625,616 B2 | 1/2014 | Vobbilisetty et al. |
| 8,627,313 B2 | 1/2014 | Edwards et al. |
| 8,644,188 B1 | 2/2014 | Brandwine et al. |
| 8,660,129 B1 | 2/2014 | Brendel et al. |
| 8,705,513 B2 | 4/2014 | Merwe et al. |
| 8,724,456 B1 * | 5/2014 | Hong .................. G06F 11/3055 |
| | | 370/225 |
| 8,745,177 B1 | 6/2014 | Kazerani et al. |
| 8,958,298 B2 | 2/2015 | Zhang et al. |
| 9,021,066 B1 | 4/2015 | Singh et al. |
| 9,032,095 B1 | 5/2015 | Traina et al. |
| 9,059,999 B2 | 6/2015 | Koponen et al. |
| 9,137,052 B2 | 9/2015 | Koponen et al. |
| 9,313,129 B2 | 4/2016 | Ganichev et al. |
| 9,419,855 B2 | 8/2016 | Ganichev et al. |
| 9,485,149 B1 | 11/2016 | Traina et al. |
| 9,503,321 B2 | 11/2016 | Neginhal et al. |
| 9,559,980 B2 | 1/2017 | Li et al. |
| 9,647,883 B2 | 5/2017 | Neginhal et al. |
| 9,749,214 B2 | 8/2017 | Han |
| 9,787,605 B2 | 10/2017 | Zhang et al. |
| 10,057,157 B2 | 8/2018 | Goliya et al. |
| 10,075,363 B2 | 9/2018 | Goliya et al. |
| 10,079,779 B2 | 9/2018 | Zhang et al. |
| 10,095,535 B2 | 10/2018 | Dubey et al. |
| 10,110,431 B2 | 10/2018 | Ganichev et al. |
| 10,129,142 B2 | 11/2018 | Goliya et al. |
| 10,129,180 B2 | 11/2018 | Zhang et al. |
| 10,153,973 B2 | 12/2018 | Dubey |
| 10,230,629 B2 | 3/2019 | Masurekar et al. |
| 10,270,687 B2 * | 4/2019 | Mithyantha ............. H04L 45/42 |
| 10,341,236 B2 | 7/2019 | Boutros et al. |
| 10,382,321 B1 | 8/2019 | Boyapati et al. |
| 10,411,955 B2 | 9/2019 | Neginhal et al. |
| 10,454,758 B2 | 10/2019 | Boutros et al. |
| 10,601,700 B2 | 3/2020 | Goliya et al. |
| 10,623,322 B1 | 4/2020 | Nallamothu |
| 10,700,996 B2 | 6/2020 | Zhang et al. |
| 2001/0043614 A1 | 11/2001 | Viswanadham et al. |
| 2002/0067725 A1 | 6/2002 | Oguchi et al. |
| 2002/0093952 A1 | 7/2002 | Gonda |
| 2002/0194369 A1 | 12/2002 | Rawlins et al. |
| 2003/0041170 A1 | 2/2003 | Suzuki |
| 2003/0058850 A1 | 3/2003 | Rangarajan et al. |
| 2003/0067924 A1 | 4/2003 | Choe et al. |
| 2003/0069972 A1 | 4/2003 | Yoshimura et al. |
| 2004/0013120 A1 | 1/2004 | Shen |
| 2004/0073659 A1 | 4/2004 | Rajsic et al. |
| 2004/0098505 A1 | 5/2004 | Clemmensen |
| 2004/0267866 A1 | 12/2004 | Carollo et al. |
| 2005/0018669 A1 | 1/2005 | Arndt et al. |
| 2005/0027881 A1 | 2/2005 | Figueira et al. |
| 2005/0053079 A1 | 3/2005 | Havala |
| 2005/0083953 A1 | 4/2005 | May |
| 2005/0120160 A1 | 6/2005 | Plouffe et al. |
| 2005/0132044 A1 | 6/2005 | Guingo et al. |
| 2006/0002370 A1 | 1/2006 | Rabie et al. |
| 2006/0018253 A1 | 1/2006 | Windisch et al. |
| 2006/0026225 A1 | 2/2006 | Canali et al. |
| 2006/0029056 A1 | 2/2006 | Perera et al. |
| 2006/0056412 A1 | 3/2006 | Page |
| 2006/0059253 A1 | 3/2006 | Goodman et al. |
| 2006/0092940 A1 | 5/2006 | Ansari et al. |
| 2006/0092976 A1 | 5/2006 | Lakshman et al. |
| 2006/0174087 A1 | 8/2006 | Hashimoto et al. |
| 2006/0187908 A1 | 8/2006 | Shimozono et al. |
| 2006/0193266 A1 | 8/2006 | Siddha et al. |
| 2006/0291387 A1 | 12/2006 | Kimura et al. |
| 2006/0291388 A1 | 12/2006 | Amdahl et al. |
| 2007/0043860 A1 | 2/2007 | Pabari |
| 2007/0064673 A1 | 3/2007 | Bhandaru et al. |
| 2007/0140128 A1 | 6/2007 | Klinker et al. |

(56) References Cited

U.S. PATENT DOCUMENTS

| | | |
|---|---|---|
| 2007/0156919 A1 | 7/2007 | Potti et al. |
| 2007/0165515 A1 | 7/2007 | Vasseur |
| 2007/0201357 A1 | 8/2007 | Smethurst et al. |
| 2007/0206591 A1 | 9/2007 | Doviak et al. |
| 2007/0297428 A1 | 12/2007 | Bose et al. |
| 2008/0002579 A1 | 1/2008 | Lindholm et al. |
| 2008/0002683 A1 | 1/2008 | Droux et al. |
| 2008/0013474 A1 | 1/2008 | Nagarajan et al. |
| 2008/0049621 A1 | 2/2008 | McGuire et al. |
| 2008/0049646 A1 | 2/2008 | Lu |
| 2008/0059556 A1 | 3/2008 | Greenspan et al. |
| 2008/0071900 A1 | 3/2008 | Hecker et al. |
| 2008/0086726 A1 | 4/2008 | Griffith et al. |
| 2008/0151893 A1 | 6/2008 | Nordmark et al. |
| 2008/0159301 A1 | 7/2008 | Heer |
| 2008/0189769 A1 | 8/2008 | Casado et al. |
| 2008/0225853 A1 | 9/2008 | Melman et al. |
| 2008/0240122 A1 | 10/2008 | Richardson et al. |
| 2008/0253366 A1 | 10/2008 | Zuk et al. |
| 2008/0253396 A1 | 10/2008 | Olderdissen |
| 2008/0291910 A1 | 11/2008 | Tadimeti et al. |
| 2009/0031041 A1 | 1/2009 | Clemmensen |
| 2009/0043823 A1 | 2/2009 | Iftode et al. |
| 2009/0064305 A1 | 3/2009 | Stiekes et al. |
| 2009/0083445 A1 | 3/2009 | Ganga |
| 2009/0092137 A1 | 4/2009 | Haigh et al. |
| 2009/0122710 A1 | 5/2009 | Bar-Tor et al. |
| 2009/0150527 A1 | 6/2009 | Tripathi et al. |
| 2009/0161547 A1 | 6/2009 | Riddle et al. |
| 2009/0249470 A1 | 10/2009 | Litvin et al. |
| 2009/0249473 A1 | 10/2009 | Cohn |
| 2009/0279536 A1 | 11/2009 | Unbehagen et al. |
| 2009/0292858 A1 | 11/2009 | Lambeth et al. |
| 2009/0300210 A1 | 12/2009 | Ferris |
| 2009/0303880 A1 | 12/2009 | Maltz et al. |
| 2010/0002722 A1 | 1/2010 | Porat et al. |
| 2010/0046531 A1 | 2/2010 | Louati et al. |
| 2010/0107162 A1 | 4/2010 | Edwards et al. |
| 2010/0115101 A1 | 5/2010 | Lain et al. |
| 2010/0131636 A1 | 5/2010 | Suri et al. |
| 2010/0153554 A1 | 6/2010 | Anschutz et al. |
| 2010/0153701 A1 | 6/2010 | Shenoy et al. |
| 2010/0162036 A1 | 6/2010 | Linden et al. |
| 2010/0165877 A1 | 7/2010 | Shukla et al. |
| 2010/0169467 A1 | 7/2010 | Shukla et al. |
| 2010/0192225 A1 | 7/2010 | Ma et al. |
| 2010/0205479 A1 | 8/2010 | Akutsu et al. |
| 2010/0214949 A1 | 8/2010 | Smith et al. |
| 2010/0275199 A1 | 10/2010 | Smith et al. |
| 2010/0290485 A1 | 11/2010 | Martini et al. |
| 2010/0318609 A1 | 12/2010 | Lahiri et al. |
| 2010/0322255 A1 | 12/2010 | Hao et al. |
| 2011/0016215 A1 | 1/2011 | Wang |
| 2011/0022695 A1 | 1/2011 | Dalal et al. |
| 2011/0026537 A1 | 2/2011 | Kolhi et al. |
| 2011/0032830 A1 | 2/2011 | Merwe et al. |
| 2011/0032843 A1 | 2/2011 | Papp et al. |
| 2011/0075664 A1 | 3/2011 | Lambeth et al. |
| 2011/0075674 A1 | 3/2011 | Li et al. |
| 2011/0085557 A1 | 4/2011 | Gnanasekaran et al. |
| 2011/0085559 A1 | 4/2011 | Chung et al. |
| 2011/0103259 A1 | 5/2011 | Aybay et al. |
| 2011/0119748 A1 | 5/2011 | Edwards et al. |
| 2011/0134931 A1 | 6/2011 | Merwe et al. |
| 2011/0142053 A1 | 6/2011 | Merwe et al. |
| 2011/0149964 A1 | 6/2011 | Judge et al. |
| 2011/0149965 A1 | 6/2011 | Judge et al. |
| 2011/0194567 A1 | 8/2011 | Shen |
| 2011/0205931 A1 | 8/2011 | Zhou et al. |
| 2011/0261825 A1 | 10/2011 | Ichino |
| 2011/0283017 A1 | 11/2011 | Alkhatib et al. |
| 2011/0299534 A1 | 12/2011 | Koganti et al. |
| 2011/0310899 A1 | 12/2011 | Alkhatib et al. |
| 2011/0317703 A1 | 12/2011 | Dunbar et al. |
| 2012/0014386 A1 | 1/2012 | Xiong et al. |
| 2012/0014387 A1 | 1/2012 | Dunbar et al. |
| 2012/0131643 A1 | 5/2012 | Cheriton |
| 2012/0155467 A1 | 6/2012 | Appenzeller |
| 2012/0182992 A1 | 7/2012 | Cowart et al. |
| 2012/0236734 A1 | 9/2012 | Sampath et al. |
| 2013/0007740 A1 | 1/2013 | Kikuchi et al. |
| 2013/0044636 A1 | 2/2013 | Koponen et al. |
| 2013/0044641 A1 | 2/2013 | Koponen et al. |
| 2013/0051399 A1 | 2/2013 | Zhang et al. |
| 2013/0058225 A1 | 3/2013 | Casado et al. |
| 2013/0058229 A1 | 3/2013 | Casado et al. |
| 2013/0058335 A1 | 3/2013 | Koponen et al. |
| 2013/0058350 A1 | 3/2013 | Fulton |
| 2013/0058353 A1 | 3/2013 | Koponen et al. |
| 2013/0060940 A1 | 3/2013 | Koponen et al. |
| 2013/0094350 A1 | 4/2013 | Mandal et al. |
| 2013/0103817 A1 | 4/2013 | Koponen et al. |
| 2013/0103818 A1 | 4/2013 | Koponen et al. |
| 2013/0132536 A1 | 5/2013 | Zhang et al. |
| 2013/0142048 A1 | 6/2013 | Gross, IV et al. |
| 2013/0148541 A1 | 6/2013 | Zhang et al. |
| 2013/0148542 A1 | 6/2013 | Zhang et al. |
| 2013/0148543 A1 | 6/2013 | Koponen et al. |
| 2013/0148656 A1 | 6/2013 | Zhang et al. |
| 2013/0151661 A1 | 6/2013 | Koponen et al. |
| 2013/0151676 A1 | 6/2013 | Thakkar et al. |
| 2013/0208621 A1 | 8/2013 | Manghirmalani et al. |
| 2013/0212148 A1 | 8/2013 | Koponen et al. |
| 2013/0223444 A1 | 8/2013 | Liljenstolpe et al. |
| 2013/0230047 A1 | 9/2013 | Subrahmaniam et al. |
| 2013/0266007 A1 | 10/2013 | Kumbhare et al. |
| 2013/0266015 A1 | 10/2013 | Qu et al. |
| 2013/0266019 A1 | 10/2013 | Qu et al. |
| 2013/0268799 A1 | 10/2013 | Mestery et al. |
| 2013/0329548 A1 | 12/2013 | Nakil et al. |
| 2013/0332602 A1 | 12/2013 | Nakil et al. |
| 2013/0332619 A1 | 12/2013 | Xie et al. |
| 2013/0339544 A1 | 12/2013 | Mithyantha |
| 2014/0003434 A1 | 1/2014 | Assarpour et al. |
| 2014/0016501 A1 | 1/2014 | Kamath et al. |
| 2014/0059226 A1 | 2/2014 | Messerli et al. |
| 2014/0146817 A1 | 5/2014 | Zhang |
| 2014/0173093 A1 | 6/2014 | Rabeela et al. |
| 2014/0195666 A1 | 7/2014 | Dumitriu et al. |
| 2014/0229945 A1 | 8/2014 | Barkai et al. |
| 2014/0241247 A1 | 8/2014 | Kempf et al. |
| 2014/0269299 A1 | 9/2014 | Koornstra |
| 2014/0328350 A1 | 11/2014 | Hao et al. |
| 2014/0372582 A1 | 12/2014 | Ghanwani et al. |
| 2014/0376550 A1 | 12/2014 | Khan et al. |
| 2015/0016300 A1 | 1/2015 | Devireddy et al. |
| 2015/0063360 A1 | 3/2015 | Thakkar et al. |
| 2015/0063364 A1 | 3/2015 | Thakkar et al. |
| 2015/0089082 A1 | 3/2015 | Patwardhan et al. |
| 2015/0092594 A1 | 4/2015 | Zhang et al. |
| 2015/0103838 A1 | 4/2015 | Zhang et al. |
| 2015/0188770 A1 | 7/2015 | Naiksatam et al. |
| 2015/0222550 A1 | 8/2015 | Anand |
| 2015/0263897 A1 | 9/2015 | Ganichev et al. |
| 2015/0263946 A1 | 9/2015 | Tubaltsev et al. |
| 2015/0263952 A1 | 9/2015 | Ganichev et al. |
| 2015/0271011 A1 | 9/2015 | Neginhal et al. |
| 2015/0271303 A1 | 9/2015 | Neginhal et al. |
| 2015/0299880 A1 | 10/2015 | Jorge et al. |
| 2016/0105471 A1 | 4/2016 | Nunes et al. |
| 2016/0119229 A1 | 4/2016 | Zhou |
| 2016/0182287 A1 | 6/2016 | Chiba et al. |
| 2016/0191374 A1 | 6/2016 | Singh et al. |
| 2016/0226700 A1 | 8/2016 | Zhang et al. |
| 2016/0226754 A1 | 8/2016 | Zhang et al. |
| 2016/0226762 A1 | 8/2016 | Zhang et al. |
| 2016/0261493 A1 | 9/2016 | Li |
| 2016/0294612 A1 | 10/2016 | Ravinoothala et al. |
| 2016/0344586 A1 | 11/2016 | Ganichev et al. |
| 2017/0005923 A1 | 1/2017 | Babakian |
| 2017/0048129 A1 | 2/2017 | Masurekar et al. |
| 2017/0048130 A1 | 2/2017 | Goliya et al. |
| 2017/0063632 A1 | 3/2017 | Goliya et al. |
| 2017/0063633 A1 | 3/2017 | Goliya et al. |

(56) References Cited

U.S. PATENT DOCUMENTS

| | | | |
|---|---|---|---|
| 2017/0064717 | A1 | 3/2017 | Filsfils et al. |
| 2017/0070425 | A1* | 3/2017 | Mithyantha ............. H04L 45/42 |
| 2017/0126497 | A1 | 5/2017 | Dubey et al. |
| 2017/0180154 | A1* | 6/2017 | Duong ................ H04L 12/4633 |
| 2017/0230241 | A1 | 8/2017 | Neginhal et al. |
| 2017/0317919 | A1 | 11/2017 | Fernando et al. |
| 2018/0006943 | A1 | 1/2018 | Dubey |
| 2018/0062914 | A1 | 3/2018 | Boutros et al. |
| 2018/0097734 | A1 | 4/2018 | Boutros et al. |
| 2018/0367442 | A1 | 12/2018 | Goliya et al. |
| 2019/0018701 | A1 | 1/2019 | Dubey et al. |
| 2019/0020580 | A1* | 1/2019 | Boutros ............. H04L 61/2069 |
| 2019/0020600 | A1 | 1/2019 | Zhang et al. |
| 2019/0109780 | A1* | 4/2019 | Nagarkar ................ H04L 45/02 |
| 2019/0124004 | A1 | 4/2019 | Dubey |
| 2019/0190885 | A1* | 6/2019 | Krug ................... H04L 61/2514 |
| 2019/0199625 | A1 | 6/2019 | Masurekar et al. |
| 2019/0245783 | A1* | 8/2019 | Mithyantha ............. H04L 43/08 |
| 2019/0281133 | A1* | 9/2019 | Tomkins ............. H04L 45/7457 |
| 2019/0312812 | A1 | 10/2019 | Boutros et al. |
| 2019/0334767 | A1 | 10/2019 | Neginhal et al. |
| 2020/0021483 | A1 | 1/2020 | Boutros et al. |
| 2020/0186468 | A1 | 6/2020 | Basavaraj et al. |
| 2020/0195607 | A1 | 6/2020 | Wang et al. |

FOREIGN PATENT DOCUMENTS

| | | | |
|---|---|---|---|
| CN | 103890751 | A | 6/2014 |
| CN | 103947164 | A | 7/2014 |
| CN | 104335553 | A | 2/2015 |
| EP | 1653688 | A1 | 5/2006 |
| EP | 2838244 | A2 | 2/2015 |
| EP | 3013006 | A1 | 4/2016 |
| JP | 2000244567 | A | 9/2000 |
| JP | 2003069609 | A | 3/2003 |
| JP | 2003124976 | A | 4/2003 |
| JP | 2003318949 | A | 11/2003 |
| JP | 2011139299 | A | 7/2011 |
| JP | 2011228864 | A | 11/2011 |
| JP | 2014534789 | A | 12/2014 |
| KR | 1020110099579 | A | 9/2011 |
| WO | 2005112390 | A1 | 11/2005 |
| WO | 2008095010 | A1 | 8/2008 |
| WO | 2013020126 | A1 | 2/2013 |
| WO | 2013026049 | A1 | 2/2013 |
| WO | 2013055697 | A1 | 4/2013 |
| WO | 2013081962 | A1 | 6/2013 |
| WO | 2013143611 | A1 | 10/2013 |
| WO | 2013184846 | A1 | 12/2013 |
| WO | 2015015787 | A1 | 2/2015 |
| WO | 2015142404 | A1 | 9/2015 |
| WO | 2016123550 | A1 | 8/2016 |
| WO | 2017027073 | A1 | 2/2017 |
| WO | 2018044746 | A1 | 3/2018 |

OTHER PUBLICATIONS

Aggarwal, R., et al., "Data Center Mobility based on E-VPN, BGP/MPLS IP VPN, IP Routing and NHRP," draft-raggarwa-data-center-mobility-05.txt, Jun. 10, 2013, 24 pages, Internet Engineering Task Force, IETF, Geneva, Switzerland.

Author Unknown, "VMware® NSX Network Virtualization Design Guide," Month Unknown 2013, 32 pages, Item No. VMW-NSX-NTWK-VIRT-DESN-GUIDE-V2-101, VMware, Inc., Palo Alto, CA, USA.

Ballani, Hitesh, et al., "Making Routers Last Longer with ViAggre," NSDI '09: 6th USENIX Symposium on Networked Systems Design and Implementation, Apr. 2009, 14 pages, USENIX Association.

Caesar, Matthew, et al., "Design and Implementation of a Routing Control Platform," NSDI '05: 2nd Symposium on Networked Systems Design & Implementation , Apr. 2005, 14 pages, Usenix Association.

Dumitriu, Dan Mihai, et al., U.S. Appl. No. 61/514,990, filed Aug. 4, 2011.

Fernando, Rex, et al., "Service Chaining using Virtual Networks with BGP," Internet Engineering Task Force, IETF, Jul. 7, 2015, 32 pages, Internet Society (ISOC), Geneva, Switzerland, available at https://tools.ietf.org/html/draft-fm-bess-service-chaining-01.

Handley, Mark, et al., "Designing Extensible IP Router Software," Proc. of NSDI, May 2005, 14 pages.

Koponen, Teemu, et al., "Network Virtualization in Multi-tenant Datacenters," Technical Report TR-2013-001E, Aug. 2013, 22 pages, VMware, Inc., Palo Alto, CA, USA.

Lakshminarayanan, Karthik, et al., "Routing as a Service," Report No. UCB/CSD-04-1327, Month Unknown 2004, 16 pages, Computer Science Division (EECS), University of California—Berkeley, Berkeley, California.

Lowe, Scott, "Learning NSX, Part 14: Using Logical Routing," Scott's Weblog: The weblog of an IT pro specializing in cloud computing, virtualization, and networking, all with an open source view, Jun. 20, 2014, 8 pages, available at https://blog.scottlowe.org/2014/06/20/learning-nsx-part-14-using-logical-routing/.

Maltz, David A., et al., "Routing Design in Operational Networks: A Look from the Inside," SIGCOMM '04, Aug. 30-Sep. 3, 2014, 14 pages, ACM, Portland, Oregon, USA.

Non-published commonly owned U.S. Appl. No. 16/210,410, filed Dec. 5, 2018, 29 pages, VMware, Inc.

Non-published commonly owned U.S. Appl. No. 16/218,433, filed Dec. 12, 2018, 27 pages, VMware, Inc.

Rosen, E., "Applicability Statement for BGP/MPLS IP Virtual Private Networks (VPNs)," RFC 4365, Feb. 2006, 32 pages, The Internet Society.

Sajassi, Ali, et al., "Integrated Routing and Bridging in EVPN draft-sajassi-l2vpn-evpn-inter-subnet-forwarding-04", Jul. 4, 2014, 24 pages.

Shenker, Scott, et al., "The Future of Networking, and the Past of Protocols," Dec. 2, 2011, 30 pages, USA.

Wang, Anjing, et al., "Network Virtualization: Technologies, Perspectives, and Frontiers," Journal of Lightwave Technology, Feb. 15, 2013, 15 pages, IEEE.

Wang, Yi, et al., "Virtual Routers on the Move: Live Router Migration as a Network-Management Primitive," SIGCOMM '08, Aug. 17-22, 2008, 12 pages, ACM, Seattle, Washington, USA.

Non-published commonly owned U.S. Appl. No. 16/823,050, filed Mar. 18, 2020, 79 pages, Nicira, Inc.

Author Unknown, "Cisco Border Gateway Protocol Control Plane for Virtual Extensible LAN," White Paper, Jan. 23, 2015, 6 pages, Cisco Systems, Inc.

Author Unknown, "Cisco Data Center Spine-and-Leaf Architecture: Design Overview," White Paper, Apr. 15, 2016, 27 pages, Cisco Systems, Inc.

Moreno, Victor, "VXLAN Deployment Models—A Practical Perspective," Cisco Live 2015 Melbourne, Mar. 6, 2015, 72 pages, BRKDCT-2404, Cisco Systems, Inc.

Non-published commonly owned U.S. Appl. No. 16/581,118, filed Sep. 24, 2019, 36 pages, Nicira, Inc.

Non-published commonly owned U.S. Appl. No. 16/868,524, filed May 6, 2020, 105 pages.

* cited by examiner

USING ROUTE TYPE TO DETERMINE ROUTING PROTOCOL BEHAVIOR

RELATED APPLICATIONS

Benefit is claimed under 35 U.S.C. 119(a)-(d) to Foreign Application Serial No. 201841044147 filed in India entitled "USING ROUTE TYPE TO DETERMINE ROUTING PROTOCOL BEHAVIOR", on Nov. 23, 2018, by VMware, Inc., which is herein incorporated in its entirety by reference for all purposes.

BACKGROUND

In a datacenter, the network administrator will often need to maintain a list of network prefixes that should be advertised to peers outside of the network (e.g., a list of public IP addresses). However, cloud environments may have fast-changing network topology, such that maintaining such a list of prefixes is difficult. This is exacerbated in a multi-tenant environment, with multiple tenant networks having various different prefixes that need to be advertised. Thus, techniques for more easily maintaining the list of network prefixes to be advertised are needed.

BRIEF SUMMARY

Some embodiments of the invention provide a method for determining the routes that a logical router advertises to external routers based at least partly on route type. In some embodiments, each route in a routing table of the logical router is tagged with a route type (e.g., connected routes, routes associated with specific service types, etc.), and the logical router is configured to advertise specific types of routes. Thus, when new routes are added to the routing table of the logical router, the method determines whether to advertise the route based on the route type rather than a route-specific configuration.

In some embodiments, the routing table is a routing table for a centralized routing component of a logical router that includes a distributed routing component and one or more centralized routing components. The centralized routing components of some embodiments each execute on a single computing device, while the distributed routing component is implemented on numerous computing devices in a datacenter (or multiple datacenters). These numerous computing devices implementing the distributed routing component may include host computers that host data compute nodes (DCNs) such as virtual machines (VMs) that are the endpoints of the logical network as well as the computing devices that implement the centralized logical routers. The centralized routing components interface with external networks (e.g., public networks) as well as centralized routing components in other datacenters, in some embodiments, while the distributed routing component interfaces with the internal logical network.

In some cases, this internal logical network includes numerous other logical routers that connect to the distributed routing component, and which may belong to different datacenter tenants. For instance, the logical router with centralized routing components that interfaces with external networks might be a provider logical router managed by the datacenter administrator, while the other logical routers are tenant logical routers managed by different datacenter tenants. The routes advertised (or potentially advertised) by the centralized routing components may be routes configured specifically for the provider logical router (e.g., static routes, connected routes based on logical switches directly connected to the provider logical router, etc.) or routes that these other tenant logical routers advertise to the provider logical router.

When a logical network configuration changes (e.g., adding new logical switches, configuration of network address translation (NAT) rules, static route configuration, load balancer or other service configurations, receipt of advertised routes from a tenant logical router due to these types of changes, etc.), a network management and control system (e.g., a centralized management and/or control plane) updates the routing tables for the centralized routing components. In some embodiments, when a new route is added, the route is tagged with a route type based on the source of the route. These route types may include, e.g., connected downlink (for logical switches connected to tenant logical routers), connected uplink (for the subnets via which the centralized routing component directly connects to external peers, etc.), NAT address, load balancer address, etc.

To determine whether to advertise a given route, the provider logical router is configured with decisions on the basis of route type. That is, if all connected downlink routes are to be advertised, then any new route with a connected downlink tag will be advertised without requiring additional administrator intervention. Similarly, if the configuration specifies that connected uplink routes are not to be advertised, then new routes with the connected uplink tag will not be advertised. In different embodiments, the decision as to whether to advertise a route may be made by the network management and control system (e.g., by tagging a route for advertisement or not when distributing the routing table configuration to the computing device implementing a centralized routing component) or by the computing device itself. In the latter case, the management and control system distributes the routes with their route type tags and also distributes the advertisement decision for each route type.

In addition to determining whether to advertise a route based on route type, some embodiments also include other factors. For example, some embodiments allow differentiation based on the source of the route (e.g., from which tenant logical router the route was learned). Thus, for example, the provider logical router could be configured to advertise NAT routes from a first tenant logical router but not from a second tenant logical router. In addition, decisions can be made based on the peer router to which the routes are advertised in some embodiments. For instance, the administrator may want certain types of routes to be advertised to external routers in a public network but not to centralized routing components in other datacenters, or vice versa.

The preceding Summary is intended to serve as a brief introduction to some embodiments of the invention. It is not meant to be an introduction or overview of all of the inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION

Some embodiments of the invention provide a method for determining the routes that a logical router advertises to external routers based at least partly on route type. In some embodiments, each route in a routing table of the logical router is tagged with a route type (e.g., connected routes, routes associated with specific service types, etc.), and the logical router is configured to advertise specific types of routes. Thus, when new routes are added to the routing table of the logical router, the method determines whether to advertise the route based on the route type rather than a route-specific configuration.

In some embodiments, the routing table is a routing table for a centralized routing component of a logical router. The logical router includes a distributed routing component and one or more centralized routing components. The centralized routing components of some embodiments each execute on a single computing device, while the distributed routing component is implemented on numerous computing devices in a datacenter (or multiple datacenters). These numerous computing devices implementing the distributed routing component may include host computers that host data compute nodes (DCNs) such as virtual machines (VMs) that are the endpoints of the logical network, as well as the computing devices that implement the centralized logical routers. The centralized routing components interface with external networks (e.g., public networks) as well as centralized routing components in other datacenters, in some embodiments, while the distributed routing component interfaces with the internal logical network.

In some cases, this internal logical network includes numerous other logical routers that connect to the distributed routing component, and which may belong to different datacenter tenants. For instance, the logical router with centralized routing components that interfaces with external networks might be a provider logical router managed by the datacenter administrator, while the other logical routers are tenant logical routers managed by different datacenter tenants. The routes advertised (or potentially advertised) by the centralized routing components may be routes configured specifically for the provider logical router (e.g., static routes, connected routes based on logical switches directly connected to the provider logical router, etc.) or routes that these other tenant logical routers advertise to the provider logical router.

Figure 1:
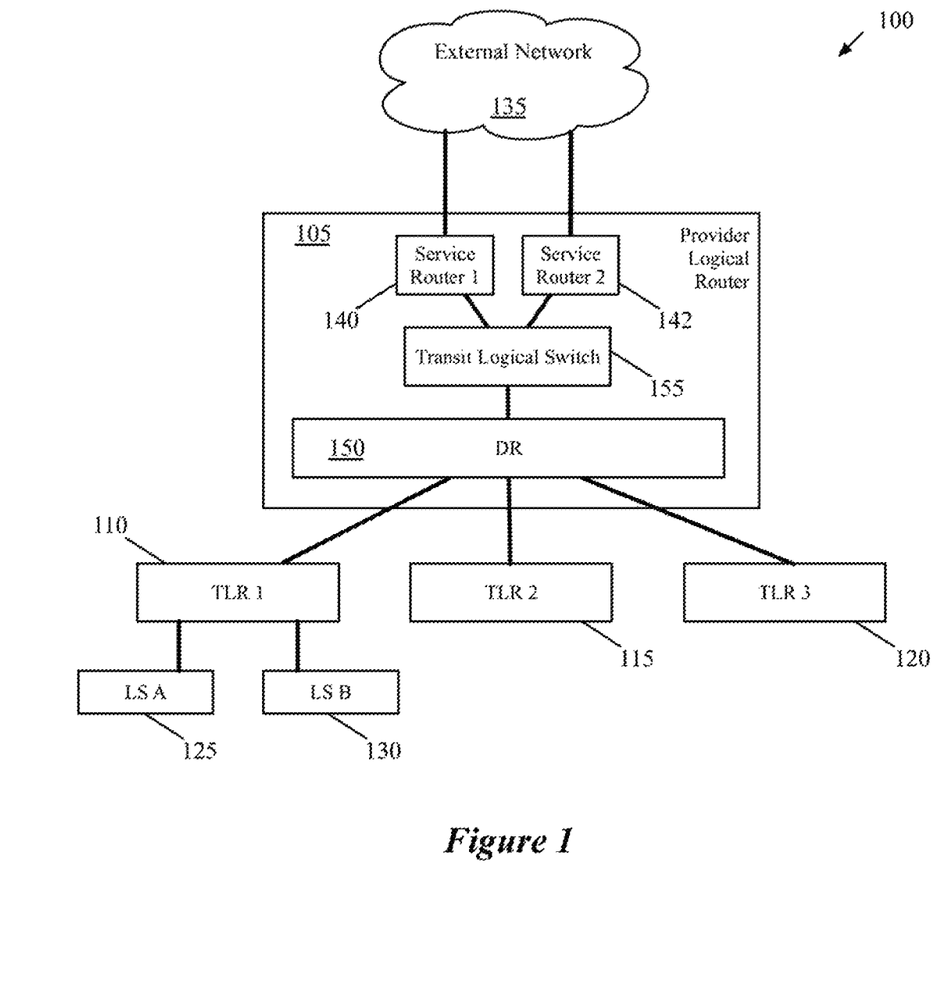
FIG. 1 conceptually illustrates a management/control plane view of a logical network with two tiers of logical routers.

FIG. 1 conceptually illustrates a network management and control system view of a logical network 100 with two tiers of logical routers. As shown, the logical network 100 includes a provider logical router 105 (PLR) and several tenant logical routers 110-120 (TLRs). The first tenant logical router 110 has two logical switches 125 and 130 attached, with one or more data compute nodes (not shown) coupling to each of the logical switches. For simplicity, only the logical switches attached to the first TLR 110 are shown, although the other TLRs 115-120 would also typically have logical switches attached (to which other data compute nodes could couple).

In some embodiments, any number of TLRs may be attached to a PLR such as the PLR 105. Some datacenters may have only a single PLR to which all TLRs implemented in the datacenter attach, whereas other datacenters may have numerous PLRs. For instance, a large datacenter may want to use different PLR policies for different tenants or groups of tenants. Alternatively, the datacenter may have too many different tenants to attach all of the TLRs to a single PLR (because, e.g., the routing table for the PLR might get too big). Part of the routing table for a PLR includes routes for all of the logical switch domains of its TLRs, so attaching numerous TLRs to a PLR creates several routes for each TLR just based on the subnets attached to the TLR. The PLR 105, as shown in the figure, provides a connection to the external physical network 135; some embodiments only allow the PLR to provide such a connection, so that the datacenter provider can manage this connection. Each of the separate TLRs 115-120, though part of the logical network 100, are configured independently (although a single tenant could have multiple TLRs if they so choose).

The PLR in FIG. 1 has centralized routing components 140 and 142 (also referred to as service routers, or SRs), a distributed routing component (DR) 150, and a transit logical switch 155, created by the network management and control system of some embodiments based on the configuration of the PLR. That is, in some embodiments a user (e.g., a network/datacenter administrator) provides a configuration of the PLR as a router with certain interfaces, and the network management and control system defines the internal components of the PLR and interfaces between these components as shown. The DR 150 includes a southbound interface for each of the TLRs 110-120, and a single northbound interface to the transit logical switch 155 (and through this to the SRs). The SRs 140-142 each include a single southbound interface to the transit logical switch 155 (used to communicate with the DR 150, as well as each other in certain situations).

Each SR 140 and 142 also corresponds to one or more uplink ports of the PLR 105 for connecting to the external network 135 in some embodiments. Each of the SRs in this example has a single north-facing interface, though in other embodiments a single SR can implement more than one uplink interface. The SRs of some embodiments are responsible for delivering services that are not implemented in a distributed fashion (e.g., some stateful services). Even if there are no stateful services configured on the logical router 105, some embodiments use centralized routing components to centralize management of the connection(s) to the external network 135.

In some embodiments, the network management and control system generates separate routing information bases (RIBs) for each of the router constructs 140-150. Essentially, the network management and control system treats each of the router constructs 140-150 as a separate logical router with separate interfaces and a separate routing table.

Figure 2:
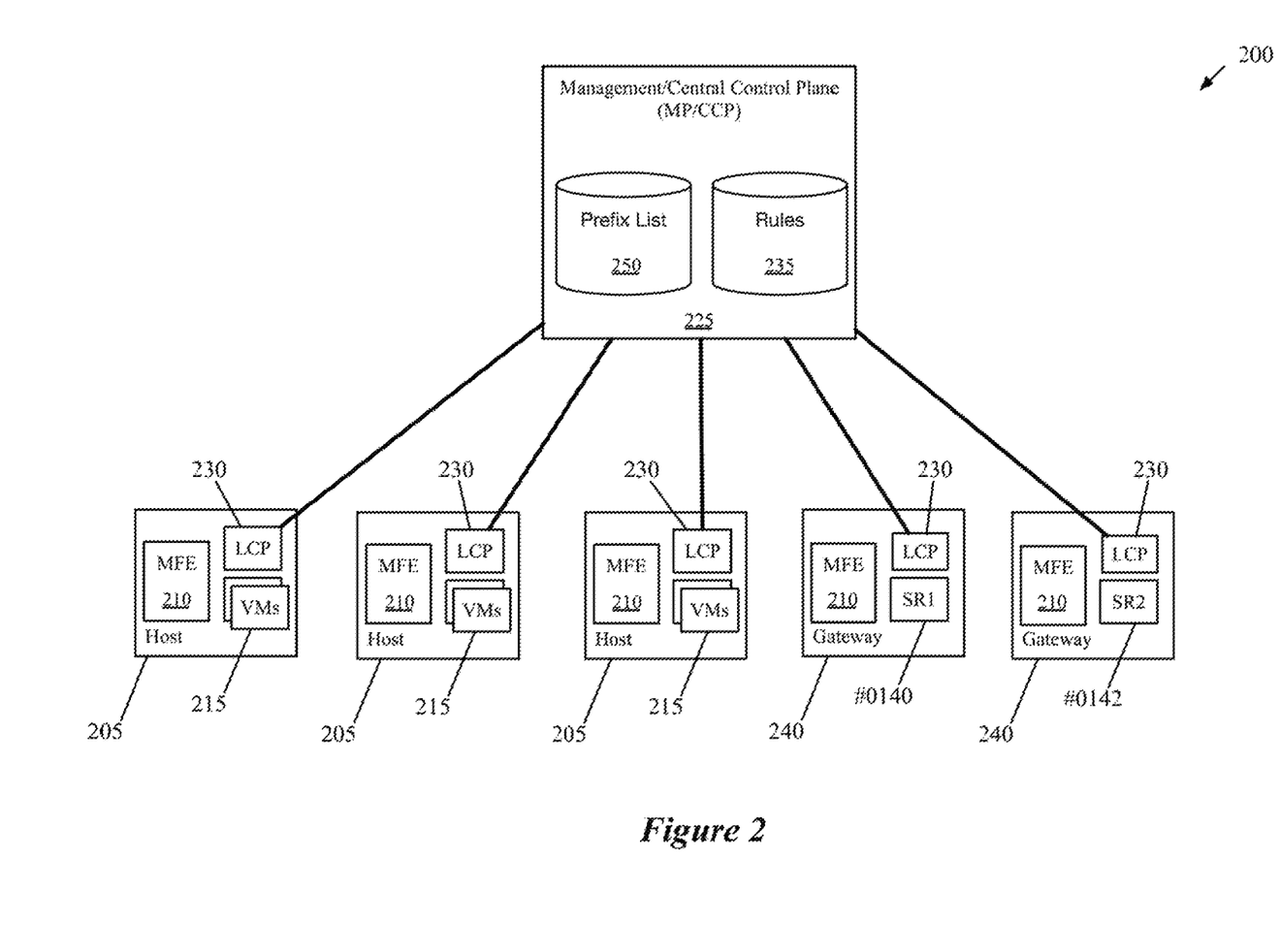
FIG. 2 illustrates a physical implementation of the logical network in FIG. 1.

FIG. 2 illustrates a physical implementation of the logical network 100. As shown, the data compute nodes (such as VMs 215) which couple to the logical switches 125 and 130 actually execute on host machines 205. The MFEs 210 that operate on these host machines 205 in some embodiments are virtual switches (e.g., Open vSwitch (OVS), ESX) that operate within the hypervisors or other virtualization software on the host machines. These MFEs 210 perform first-hop switching and routing to implement the logical switches 125 and 130, the TLRs 100-120, and the PLR 105, for packets sent by the VMs 215 of the logical network 100. The MFEs 210 (or a subset of them) also may implement logical switches (and distributed logical routers) for other logical networks if the other logical networks have VMs that reside on the host machines 205 as well.

Figure 5:
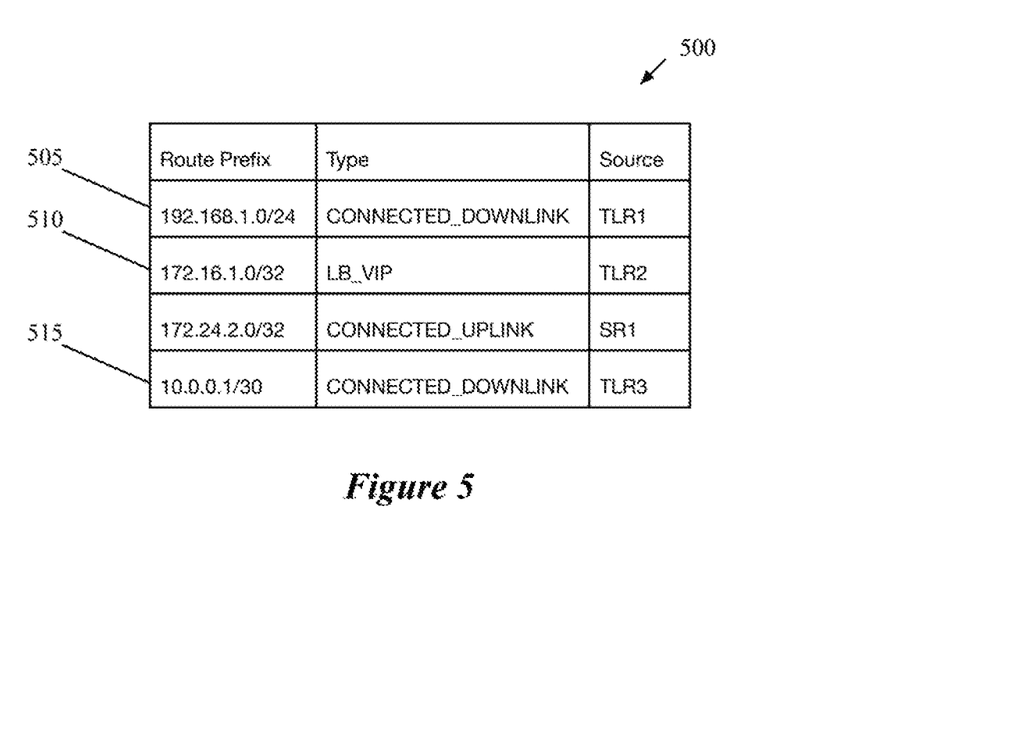
FIG. 5 illustrates a portion of the prefix list used in configuring the logical network.

FIG. 2 also illustrates the network management and control system for the logical network 100. The configuration of the MFEs 205 is controlled by a management and central control plane cluster 225 (MP/CCP), which calculates and distributes configuration data to each MFE. In some embodiments, each host machine 205 also hosts a local control plane agent 230 (LCP) which receives the configuration data from the MP/CCP 225, converts the data into a format useable by the local MFE 210, if needed, and distributes the converted data to the local MFE 210. The MP/CCP 225 generates the configuration data based on the specification of the logical network 100 (e.g., based on administrator-entered network configuration). The MP/CCP 225 may also include a prefix list 250 of routes for advertisement, with additional information like tags that indicate the type of route and the source of the route. An example of such a prefix list is illustrated in FIG. 5 and explained in further detail below.

The centralized routing components 140 and 142 each operate on a different gateway machine 240. Unlike the DR, these SRs are centralized to the gateway machines and not distributed. The gateway machines 240 are host machines similar to the machines 205 in some embodiments, hosting centralized routing components rather than user VMs (in other embodiments, host machines may host both centralized routing components as well as user VMs). In some embodiments, the gateway machines 240 each include an MFE 210 as well as the centralized routing components 140-142, in order for the MFE to handle logical switching as well as routing for the logical routers. As an example, packets sent from the external network 135 may be routed by the SR routing table on one of the gateway machines and then subsequently switched and routed (according to the DR routing table) by the MFE on the same gateway. In other embodiments, the gateway machine executes a single datapath (e.g., a DPDK-based datapath) that implements the SR as well as the DR and other distributed logical forwarding elements. The gateway machines 240 may also include an LCP 230 to receive configuration data from the MP/CCP 225.

The SRs 140 and 142 may be implemented in a namespace, a virtual machine, as a VRF, etc., in different embodiments. The SRs may operate in an active-active or active-standby mode in some embodiments, depending on whether any stateful services (e.g., firewalls) are configured on the logical router. When stateful services are configured, some embodiments require only a single active SR. In some embodiments, the active and standby service routers are provided with the same configuration, but the MFEs 210 are configured to send packets via a tunnel to the active SR (or to the MFE on the gateway machine with the active SR). Only if the tunnel is down will the MFE send packets to the standby gateway.

In order for VMs in the logical network 100 to receive southbound data message traffic, the SRs 140 and 142 of some embodiments (or routing protocol applications executing on the gateways alongside the SRs) advertise routes to their network peers. Route advertisement in logical networks is explained in further detail in U.S. Pat. Nos. 10,075,363, 10,038,628, and 9,590,901, which are incorporated herein by reference. However, not all routes should be advertised to all neighbors. Some network prefixes, such as those for private subnets, should only be redistributed to selected internal peers and not to the Internet, for example. Routes may also be specific to certain tenants and should not be available to other tenants. A NAT IP block or a load balancer virtual IP address might only be advertised to the Internet, whereas a private network could be advertised to a peer in a remote site connected over a VPN or not at all. These advertisement decisions are dependent on the type of the route and the source of the route in some embodiments.

Figure 3:
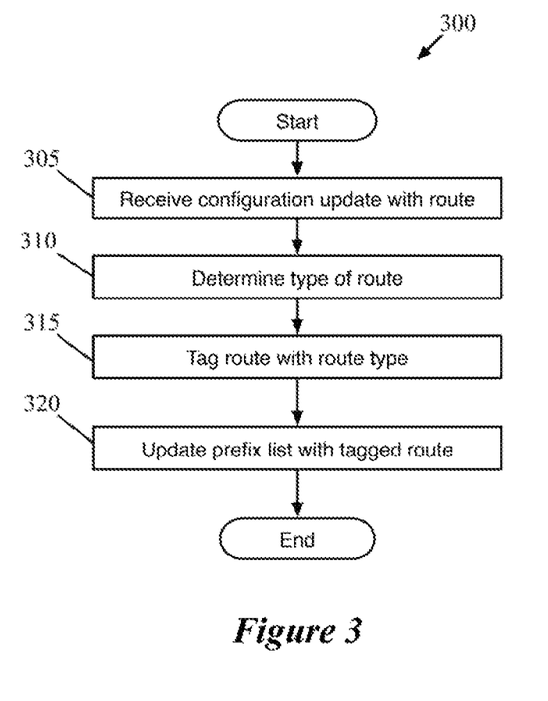
FIG. 3 illustrates a process performed in some embodiments by the management/control plane to assign tags to routes specifying the route type.

In some embodiments, these advertisement decisions are controlled using tags that indicate the type and source of route. FIG. 3 illustrates a process 300 of some embodiments for assigning these tags. In some embodiments, the process 300 is performed by the network management and control system (e.g., by a management plane and/or central control plane). When a logical network 100 configuration changes, the network management and control system updates the routing tables for the centralized routing components. Examples of configuration changes or updates include configuration of ports and types of ports, configuration of network address translation (NAT) rules, static route configuration, load balancer or other service configurations, DNS services, VPN endpoints, adding new logical switches, receipt of advertised routes from a tenant logical router due to these types of changes, etc.

As shown, the process 300 begins by receiving (at 305) a configuration update that includes a route. This may involve the direct configuration of a route by an administrator or a configuration update that indirectly results in the creation (or deletion) of a route, such as the connection of a logical switch or creation of a new NAT IP address.

After receiving the route, the process 300 determines (at 310) the type of the route. Some examples of route types may include, e.g., connected downlink (for logical switches connected to tenant logical routers), connected uplink (for the subnets via which the centralized routing component directly connects to external peers, etc.), NAT address, load balancer address, services like DNS and IPSec, etc. The routes may include routes advertised from tier 1 routers (i.e., the TLRs 110-120) as well as routes directly configured for the centralized routing components. In some embodiments, the route types may be manually pre-defined by a user.

Once the type of route is determined, the process 300 tags the route (at 315) with the determined route type. Tags may also be removed from a route or modified for a route as necessary. All advertised prefixes are tagged and tracked separately with different sets of route types. Automatic tracking of network prefixes helps the administrator write simple redistribution rules and BGP filters, for example. In some embodiments, a prefix may also be tagged with a tag indicating that the prefix is not to be advertised.

In some embodiments, the routes, their associated route types (i.e., tags), and their source are stored as a prefix list 250 in the MP/CCP 225. The process 300 updates (at 320) the prefix list with the tagged route. A logical router may host multiple virtual routing and forwarding (VRF) contexts, in which case a separate prefix list is maintained for each VRF. In some embodiments, the updated prefix list is also distributed to the local agents 230. The process 300 then ends.

Figure 4:
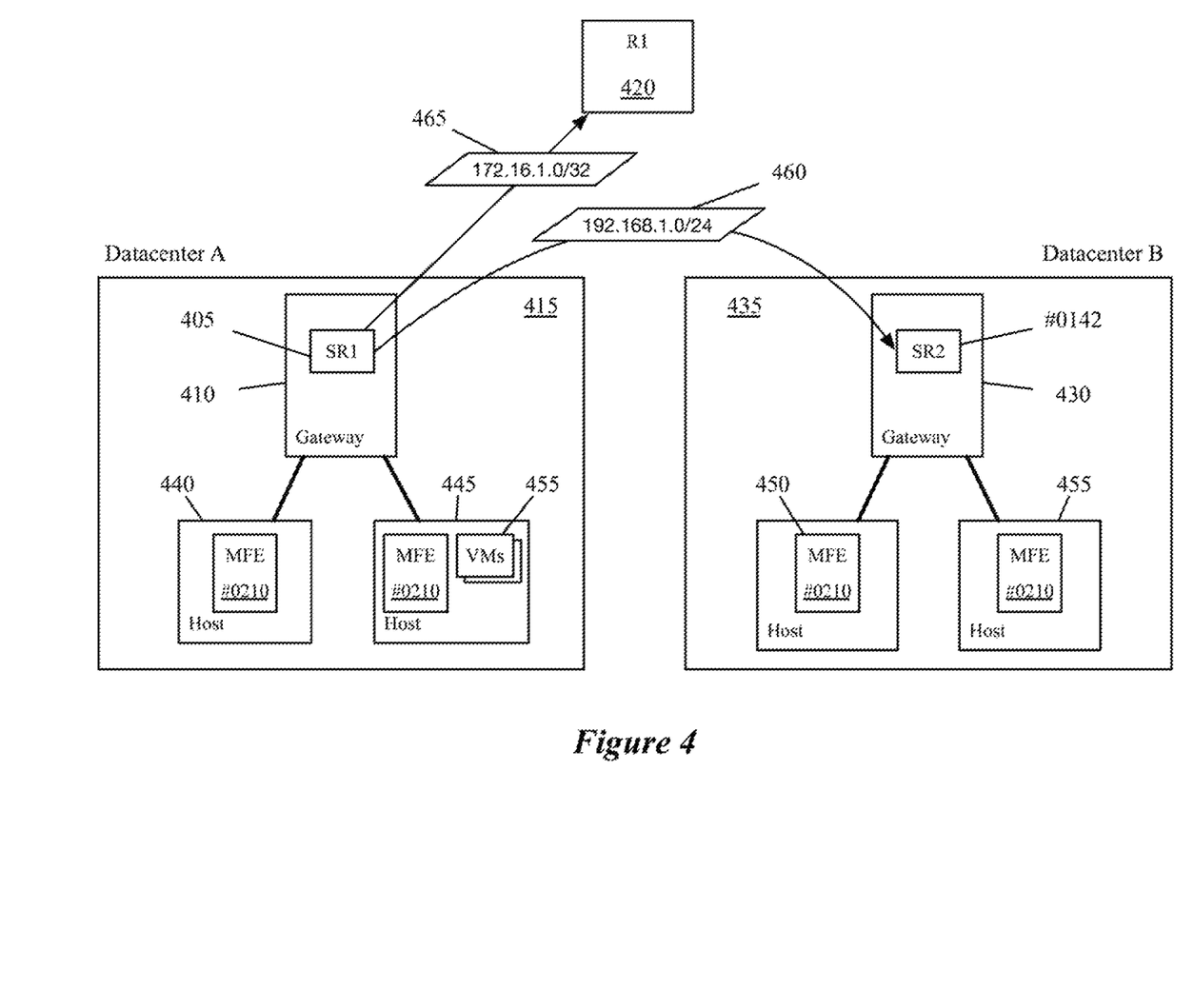
FIG. 4 conceptually illustrates an example of advertising routes based on route type and/or route source.
Figure 6:
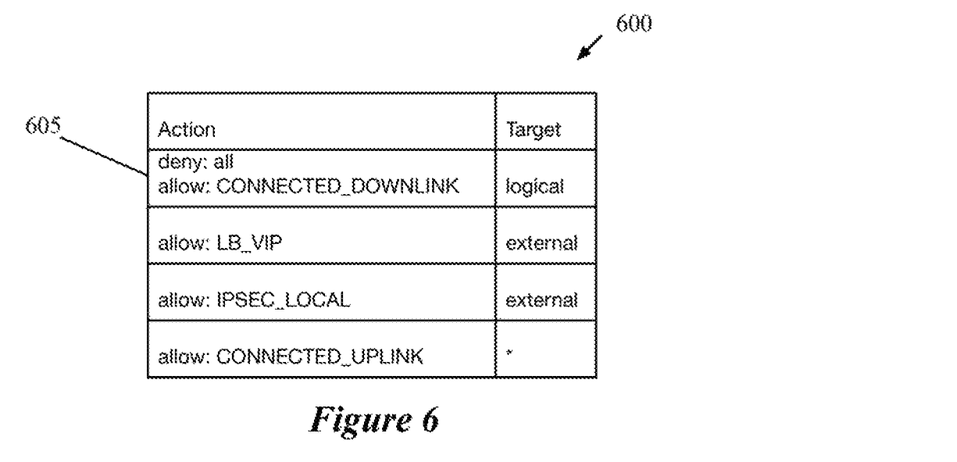
FIG. 6 illustrates a portion of the rules table used to make decisions about advertising routes.

FIG. 4 conceptually illustrates an example of advertising routes based on route type and/or route source. In this example, a first SR 405 of a logical router executes on a gateway machine 410 in a datacenter 415 (Datacenter A). FIG. 5 illustrates a portion of the prefix list used in configuring the logical network at Datacenter A, and FIG. 6 illustrates a portion of the associated rules table used by SR1 405 in making decisions about advertising routes. In some embodiments, the rules or filters in the rules database 600 may be simple expressions based on the tags, such as "deny:all and allow:connected_downlinks." Some of these rules may also specify applicable peer targets, such as "external", "logical", or specific router interfaces. In other embodiments, the prefix list 500 can be referred to in route maps (not shown). With route maps, multiple actions can be applied such as set community, set Autonomous System (AS) path, etc.

In the illustrated example of FIG. 4, the first SR 405 peers with an external router 420 in an external network. In addition, this first SR 405 also peers with a second SR 425 executing on a gateway host 430 in a different datacenter 435 (Datacenter B). In some embodiments, the gateways 410 and 430 may implement the same logical network spanning host machines 440-455 in both datacenters, or different logical networks (or logical network segments) that only communicate through the gateways.

In the example, the first SR 405 advertises several routes as specified in the prefix list 500 of FIG. 5. The first route 505 indicates a private subnet 192.168.1.0/24 with a route type as "connected downlink", associated with a tenant logical router TLR1. Since this subnet is private, this route should be advertised to the second SR 425 in Datacenter B 435, but not to the external router R1 420. In order to properly advertise this route and other routes of the same classification, a rule 605 can be specified in the rules table 600 in the MP/CCP 225 which specifies that routes with "connected downlink" type should only be advertised to logical peers. SR1 405 is then accordingly configured by the MP/CCP 225, so that it advertises the route to SR2 425, but not to R1 420. Accordingly, SR1 sends a route advertisement 460 containing the route 505 to SR2 425.

A second route 510 indicates a load balancer service which directs traffic between multiple VMs running copies of a web application. The load balancer route prefix is for a single IP address, 172.16.1.0/32, indicating that all traffic bound for the web application must go through the load balancer and be distributed between the various VMs running the web application. Accordingly, this route is listed in the second entry 510 of the prefix list 500 with a route type of "load balancer virtual IP address" and associated with a tenant logical router TLR2. Since the web application is public, the route to the load balancer should be advertised to the external router 420. In order to properly advertise this route, a rule 610 can be specified in the rules table 600 in the network management and control system that specifies routes with "load balancer virtual IP" type should be advertised to external peers. The first SR 405 is then accordingly configured by the network management and control system, so that it advertises the route to the external router 420. Accordingly, the first SR 405 sends a route advertisement message 465 for the route 510 to the external router 420.

If, for example, the tenant decides to create a new subnet, then the administrator would specify the new subnet by providing configuration data to the network management and control system. The addition of the subnet would be detected and tagged with "connected downlink" type according to the process 300 described above and added to the prefix list 500 as a new entry 515. The updated prefix list 500 would then be used by the network management and control system to generate new configuration data, which would then update the configuration of the gateways 410 and 430 in Datacenters A 415 and B 435. This new subnet would then not be advertised according to the same rule used to determine advertisement for the route 505, even though the route 515 is for a different subnet and has a different source.

In some embodiments, routes are advertised by a routing protocol control plane element executing on the host machines 205 and the gateway machines 240. For example, a Border Gateway protocol (BGP) control plane element would handle processing of incoming and outgoing advertisement messages 460 and 465.

To determine whether to advertise a given route, in some embodiments the gateway machines 240 are configured by the network management and control system 225 to make decisions on the basis of route type. That is, if all connected downlink routes are to be advertised, then any new route with a connected downlink tag will be provided to the SR routing table and the gateway will make the determination to advertise the new route without requiring additional administrator intervention. In different embodiments, the decision as to whether to advertise a route may be made by the network management and control system (e.g., by tagging a route for advertisement or not when distributing the routing table configuration to the computing device implementing an SR). The network management and control system distributes the routes with their route type tags and also distributes the advertisement decision for each route type.

In addition to determining whether to advertise a route based on route type, some embodiments also include other factors. For example, some embodiments allow differentiation based on the source of the route (e.g., from which tenant logical router the route was learned). As noted above, some embodiments also store the source for each prefix in the prefix list 250. Thus, for example, the provider logical router could be configured to advertise NAT routes from a first tenant logical router but not from a second tenant logical router. In addition, decisions can be made based on the peer router to which the routes are advertised in some embodiments. For instance, the administrator may want certain types of routes to be advertised to external routers in a public network but not to centralized routing components in other datacenters, or vice versa. These rules for advertising based on type and source are defined and stored in the rules storage database 235.

Figure 7:
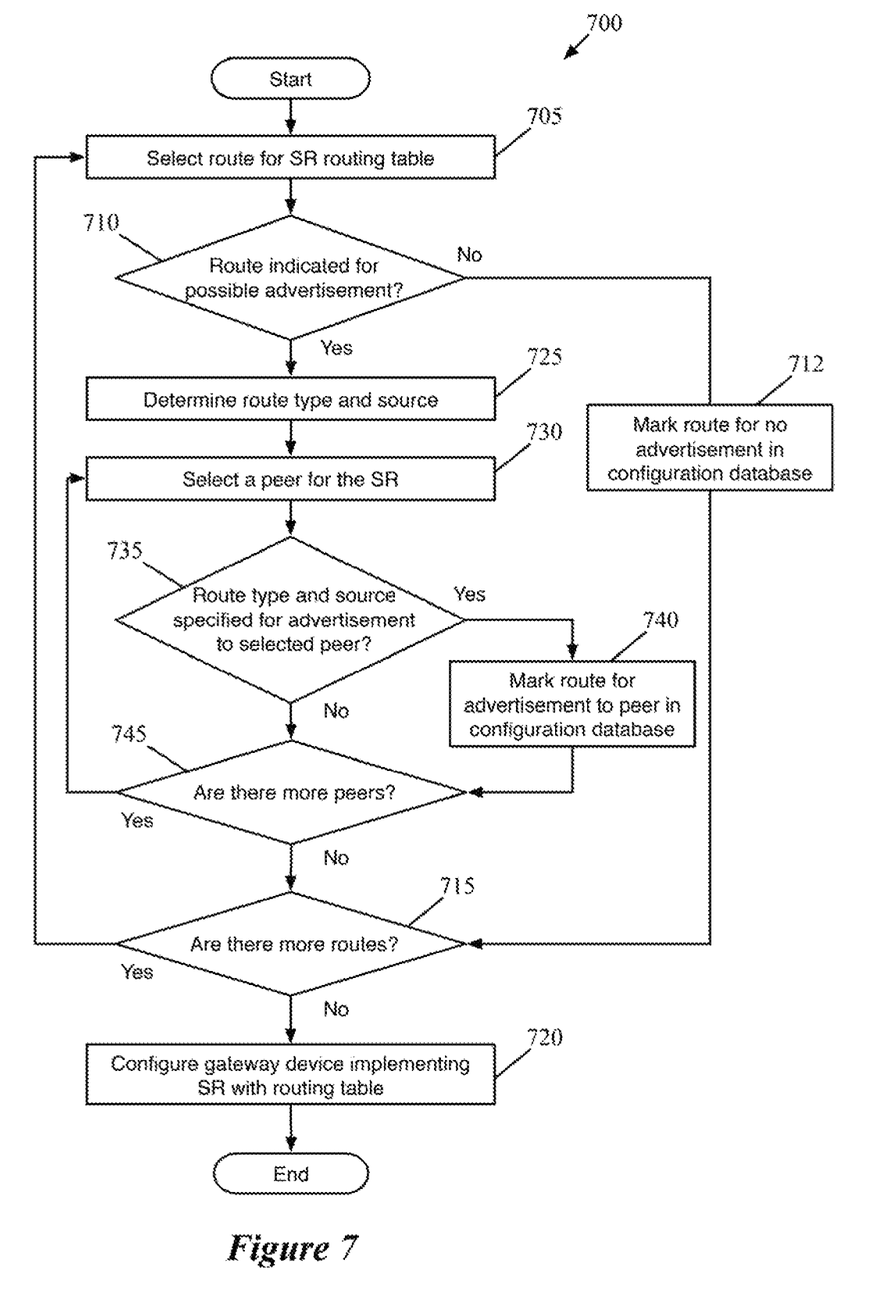
FIG. 7 illustrates a process performed by the network management and control system in some embodiments for determining route advertisements.

FIG. 7 illustrates a process 700 of some embodiments for determining whether a centralized routing component will advertise a set of routes. In some embodiments, the process 700 is performed by the network management and control system in order to configure an SR. In other embodiments, a similar process is performed by the SR or a module operating on a gateway host machine with an SR without involving the central manager or controller.

The process 700 begins (at 705) by selecting a route intended for the SR routing table. The SR's routing table is populated with routes based on the definition of the logical network in the network management and control system. The routes in the routing table therefore depend on the logical and physical network topologies as well as any additional configuration data that the network management and control system receives (e.g., static route configuration, configuring specific services with IP addresses, etc.).

The process 700 then determines (at 710) whether the route is indicated for potential advertisement. In some embodiments, the process checks the selected route against the prefix list (e.g., the prefix list 250) and the rules database (e.g., the rules database 235) to determine if the route may potentially be advertised. If the selected route is not for advertisement irrespective of its route type (e.g., a static route configured for an SR that is only for internal use), then the route is marked (at 712) as not for advertisement in a local configuration database. This database is used by the network management and control system to generate the configuration data for configuring the gateway device on which the SR resides. The process then proceeds to 715, which is described below.

If the selected route is determined to be conditionally advertised, then the process 700 determines (at 725) the route type and source (e.g., from the prefix list). The process 700 then selects (at 730) one of the SR's peer routers. As described above, these routers with which the SR peers (e.g., using BGP and/or OSPF) may include external routers as well as other SRs in the logical network topology (e.g., in other datacenters).

The process 700 then determines (at 735) whether the route type and/or route source are specified for advertisement to the selected peer. In some embodiments, this determination is based on rules or filters defined by an administrator via the network management and control system, and stored in the rules database while defining the logical network or updating its configuration. Some route types are always advertised to certain peers regardless of their source, whereas other route types may be advertised to one peer but not another. In some cases, the route type may be advertised to one peer but not another peer based on the route source, such as a private subnet which is only advertised to internal logical routers but not to external networks.

If the selected route is specified for advertisement to the selected peer, then the process 700 marks (at 740) the route for advertisement in the local configuration database. This database is used by the network management and control system to generate the configuration data for configuring the gateway device on which the SR resides. The process 700 then determines (at 745) whether any additional peers remain to be evaluate for advertisement of the selected route. If any peers remain, the process returns to 730 to select the next peer router and determine whether the SR will advertise the route to that peer.

Once the process has evaluated whether to advertise the route to each of the peers of the SR, the process 700 determines (at 715) whether there are any additional routes in the SR routing table. If there are additional routes, the process 500 returns to 705 to select the next route, until all routes have been evaluated. Once all of the routes have been evaluated, the process configures (at 720) the gateway device that implements the SR, using the information in the local configuration database. The process 700 then ends.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 8:
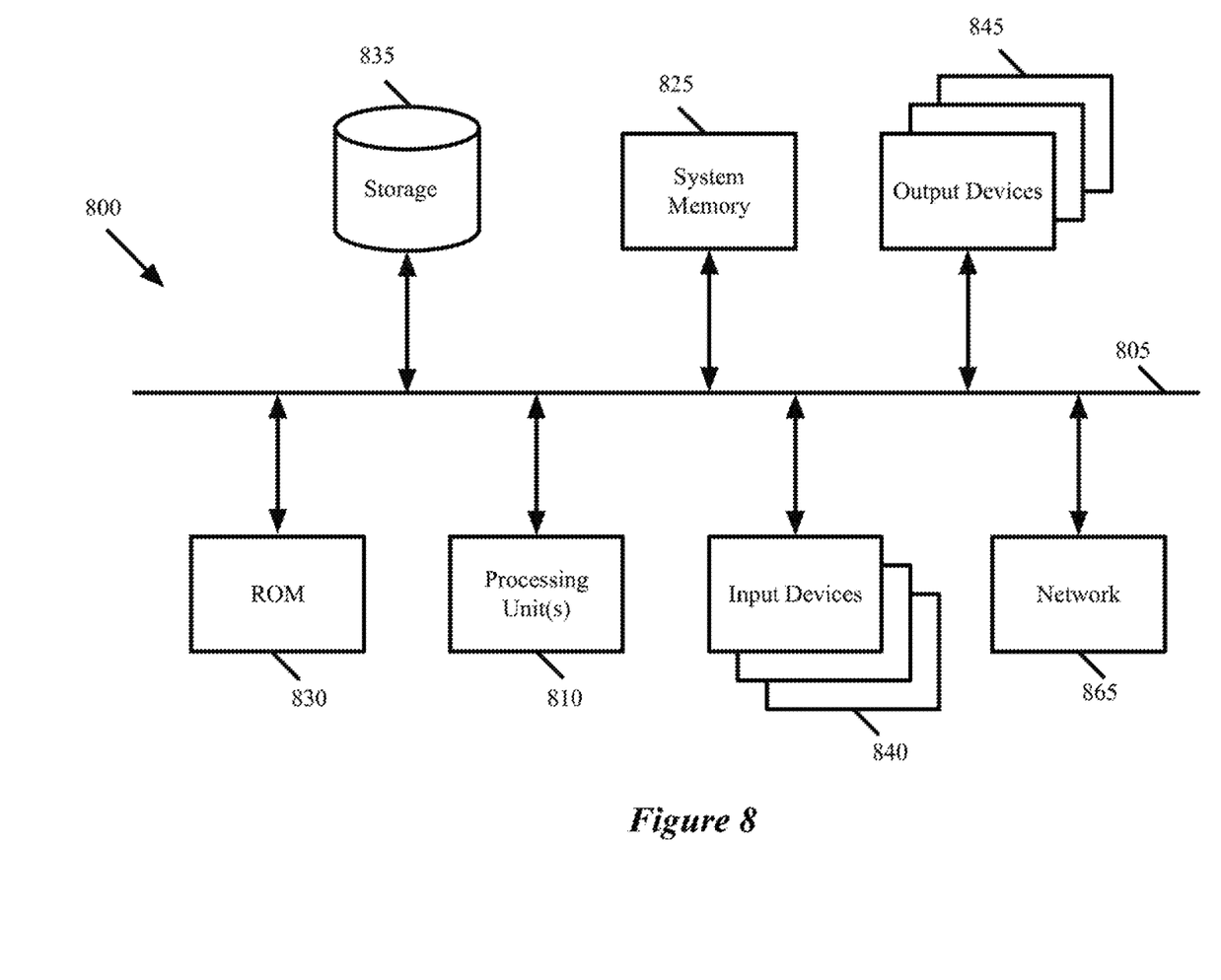
FIG. 8 conceptually illustrates an electronic system with which some embodiments of the invention are implemented.

FIG. 8 conceptually illustrates an electronic system 800 with which some embodiments of the invention are implemented. The electronic system 800 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 800 includes a bus 805, processing unit(s) 810, a system memory 825, a read-only memory 830, a permanent storage device 835, input devices 840, and output devices 845.

The bus 805 collectively represents all system, peripheral, and chipset buses that communicatively connect the numerous internal devices of the electronic system 800. For instance, the bus 805 communicatively connects the processing unit(s) 810 with the read-only memory 830, the system memory 825, and the permanent storage device 835.

From these various memory units, the processing unit(s) 810 retrieve instructions to execute and data to process in order to execute the processes of the invention. The processing unit(s) may be a single processor or a multi-core processor in different embodiments.

The read-only-memory (ROM) 830 stores static data and instructions that are needed by the processing unit(s) 810 and other modules of the electronic system. The permanent storage device 835, on the other hand, is a read-and-write memory device. This device is a non-volatile memory unit that stores instructions and data even when the electronic system 800 is off. Some embodiments of the invention use a mass-storage device (such as a magnetic or optical disk and its corresponding disk drive) as the permanent storage device 835.

Other embodiments use a removable storage device (such as a floppy disk, flash drive, etc.) as the permanent storage device. Like the permanent storage device 835, the system memory 825 is a read-and-write memory device. However, unlike storage device 835, the system memory is a volatile read-and-write memory, such as random-access memory. The system memory stores some of the instructions and data that the processor needs at runtime. In some embodiments, the invention's processes are stored in the system memory 825, the permanent storage device 835, and/or the read-only memory 830. From these various memory units, the processing unit(s) 810 retrieve instructions to execute and data to process in order to execute the processes of some embodiments.

The bus 805 also connects to the input and output devices 840 and 845. The input devices enable the user to communicate information and select commands to the electronic system. The input devices 840 include alphanumeric keyboards and pointing devices (also called "cursor control devices"). The output devices 845 display images generated by the electronic system. The output devices include printers and display devices, such as cathode ray tubes (CRT) or liquid crystal displays (LCD). Some embodiments include devices such as a touchscreen that function as both input and output devices.

Finally, bus 805 also couples electronic system 800 to a network 865 through a network adapter (not shown). In this manner, the computer can be a part of a network of computers (such as a local area network ("LAN"), a wide area network ("WAN"), or an Intranet, or a network of networks, such as the Internet. Any or all components of electronic system 800 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

This specification refers throughout to computational and network environments that include virtual machines (VMs). However, virtual machines are merely one example of data compute nodes (DNCs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system isolates the containers for different tenants and therefore provides operating-system level segregation of the different groups of applications that operate within different containers. This segregation is akin to the VM segregation that is offered in hypervisor-virtualized environments, and thus can be viewed as a form of virtualization that isolates different groups of applications that operate in different containers. Such containers are more lightweight than VMs.

Hypervisor kernel network interface modules, in some embodiments, is a non-VM DCN that includes a network stack with a hypervisor kernel network interface and receive/transmit threads. One example of a hypervisor kernel network interface module is the vmknic module that is part of the ESX hypervisor of VMware Inc.

One of ordinary skill in the art will recognize that while the specification refers to VMs, the examples given could be any type of DCNs, including physical hosts, VMs, non-VM containers, and hypervisor kernel network interface modules. In fact, the example networks could include combinations of different types of DCNs in some embodiments.

In addition, as used in this document, the term data packet, packet, data message, or message refers to a collection of bits in a particular format sent across a network. It should be understood that the term data packet, packet, data message, or message may be used herein to refer to various formatted collections of bits that may be sent across a network, such as Ethernet frames, IP packets, TCP segments, UDP datagrams, etc. While the description above refers to data packets, packets, data messages, or messages, it should be understood that the invention should not be limited to any specific format or type of data message.

While the invention has been described with reference to numerous specific details, one of ordinary skill in the art will recognize that the invention can be embodied in other specific forms without departing from the spirit of the invention. In addition, at least one figure conceptually illustrates a process. The specific operations of this process may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

What is claimed is:
1. A method for implementing a logical router in a logical network, the method comprising:
    based on logical network configuration data, identifying (i) a route for a set of network addresses to add to a routing table of the logical router and (ii) a route type for the identified route, the logical router having a set of peer routers to which the logical router advertises routes;
based on the route type of the identified route, determining separately for each particular peer router of the set of peer routers whether to include the identified route as a route for the logical router to advertise to the particular peer router; and
distributing a routing table comprising the identified route to a computing device that implements the logical router, wherein the computing device advertises the identified route to a peer router when the route type is specified for advertisement to the peer router, wherein the computing device advertises the route to a first peer router of the logical router but does not advertise the route to a second peer router of the logical router.

2. The method of claim 1, wherein the computing device does not advertise the identified route when the route type is not specified for advertisement.

3. The method of claim 1, wherein the route type comprises a connected uplink, a connected downlink, and a set of different network service types.

4. The method of claim 3, wherein the set of network service types comprises at least one of network address translation (NAT), load balancing, Internet Protocol security (IPSec), and Dynamic Host Configuration Protocol (DHCP).

5. The method of claim 1, wherein the set of peer routers comprises at least one physical router external to the logical network.

6. The method of claim 1, wherein the logical router is a first logical router implemented by a first computing device in a first datacenter, wherein the set of peer routers comprises a second logical router implemented by a second computing device in a second datacenter.

7. The method of claim 1, wherein the logical router comprises a distributed routing component and a set of centralized routing components, wherein the distributed routing table is a routing table for one of the centralized routing components.

8. The method of claim 7, wherein the distributed routing component is implemented by a plurality of computing devices including the computing device.

9. The method of claim 7, wherein each of the centralized routing components is implemented by a different computing device.

10. A method for implementing a first logical router in a logical network, the method comprising:
determining that a route is advertised to the first logical router by a second logical router that connects to the first logical router;
identifying (i) the route for a set of network addresses to add to a routing table of the first logical router and (ii) a route type for the route;
determining whether to include the route as a route for the first logical router to advertise based on the route type of the route and the second logical router; and
when the determination is made that the route has to be advertised, distributing a routing table comprising the route to a computing device that implements the first logical router in order for the computing device to advertise the route.

11. The method of claim 10, wherein the first logical router advertises routes of a particular route type that are advertised to the first logical router from the second logical router and does not advertise routes of the particular route type that are advertised to the first logical router from a third logical router.

12. The method of claim 11, wherein the first logical router is configured by an administrator of a datacenter and provides a connection to external networks for a plurality of tenant logical networks, wherein the second and third logical routers are configured by different datacenter tenants and connect different tenant logical networks to the first logical router.

13. A non-transitory machine-readable medium storing a program executable by at least one processing unit, the program for implementing a logical router in a logical network, the program comprising sets of instructions for:
based on logical network configuration data, identifying (i) a route for a set of network addresses to add to a routing table of the logical router and (ii) a route type for the identified route, the logical router having a set of peer routers to which the logical router advertises routes;
based on the route type of the identified route, determining separately for each particular peer router of the set of peer routers whether to include the identified route as a route for the logical router to advertise to the particular peer router; and
distributing a routing table comprising the identified route to a computing device that implements the logical router, wherein the computing device advertises the identified route to a peer router when the route type is specified for advertisement to the peer router, wherein the computing device advertises the route to a first peer router of the logical router but does not advertise the route to a second peer router of the logical router.

14. The non-transitory machine-readable medium of claim 13, wherein the computing device does not advertise the identified route when the route type is not specified for advertisement.

15. The non-transitory machine-readable medium of claim 13, wherein the first logical router comprises a distributed routing component and a set of centralized routing components, wherein the distributed routing table is a routing table for one of the centralized routing components, wherein the distributed routing component is implemented by a plurality of computing devices including the computing device, wherein each of the centralized routing components is implemented by a different computing device.

16. A non-transitory machine-readable medium storing a program executable by at least one processing unit, the program for implementing a first logical router in a logical network, the program comprising sets of instructions for:
determining that a route is advertised to the first logical router by a second logical router that connects to the first logical router;
identifying (i) the route for a set of network addresses to add to a routing table of the first logical router and (ii) a route type for the route;
determining whether to include the route as a route for the first logical router to advertise based on the route type of the route and the second logical router; and
when the determination is made that the route has to be advertised, distributing a routing table comprising the route to a computing device that implements the first logical router in order for the computing device to advertise the route.

17. The non-transitory machine-readable medium of claim 16, wherein the first logical router advertises routes of a particular route type that are advertised to the first logical router from a second logical router and does not advertise routes of the particular route type that are advertised to the first logical router from a third logical router.

\* \* \* \* \*